US011979822B2

(12) United States Patent
Pick et al.

(10) Patent No.: US 11,979,822 B2
(45) Date of Patent: May 7, 2024

(54) MACHINE LEARNING BASED DYNAMIC DEMODULATOR SELECTION

(71) Applicant: QUALCOMM Incorporated, San Diego, CA (US)

(72) Inventors: Jacob Pick, Beit Zayit (IL); Shay Landis, Hod Hasharon (IL); Shlomit Shaked, Rosh Haayin (IL)

(73) Assignee: QUALCOMM Incorporated, San Diego, CA (US)

(*) Notice: Subject to any disclaimer, the term of this patent is extended or adjusted under 35 U.S.C. 154(b) by 320 days.

(21) Appl. No.: 17/388,942

(22) Filed: Jul. 29, 2021

(65) Prior Publication Data

US 2023/0035125 A1 Feb. 2, 2023

(51) Int. Cl.
*H04W 48/18* (2009.01)
*H04L 5/00* (2006.01)
*H04W 72/542* (2023.01)
*H04W 76/25* (2018.01)

(52) U.S. Cl.
CPC ........... *H04W 48/18* (2013.01); *H04L 5/0005* (2013.01); *H04W 72/542* (2023.01); *H04W 76/25* (2018.02)

(58) Field of Classification Search
CPC ... H04W 48/18; H04W 76/25; H04W 72/542; H04L 5/0005
See application file for complete search history.

(56) References Cited

U.S. PATENT DOCUMENTS

| | | | |
|---|---|---|---|
| 8,660,210 B2 | 2/2014 | Kim | |
| 2013/0251074 A1* | 9/2013 | Uln | H04L 1/0054 375/343 |
| 2018/0278354 A1* | 9/2018 | Nordström | H04W 72/20 |
| 2019/0007181 A1* | 1/2019 | Marinier | H04L 5/0051 |
| 2019/0261370 A1* | 8/2019 | Amini | G08B 13/19669 |
| 2020/0293894 A1 | 9/2020 | Kwon et al. | |
| 2021/0049451 A1* | 2/2021 | Wang | H04W 4/06 |

OTHER PUBLICATIONS

International Search Report and Written Opinion—PCT/US2022/073182—ISA/EPO—dated Oct. 14, 2022.

* cited by examiner

*Primary Examiner* — Mohammad S Adhami
*Assistant Examiner* — Jesse P. Samluk
(74) *Attorney, Agent, or Firm* — Arent Fox Schiff LLP

(57) ABSTRACT

A user equipment may be configured to perform demodulator selection based on ML model coefficients trained by a base station. In some aspects, the user equipment may transmit a dynamic demodulator indication to a base station, transmit channel information to the base station, and receive, in response to the dynamic demodulator indication, updated coefficient information based on the channel information. Further, the user equipment may select a demodulator based on the updated coefficient information, and communicate with the base station via the demodulator in response to the selection of the demodulator.

30 Claims, 8 Drawing Sheets

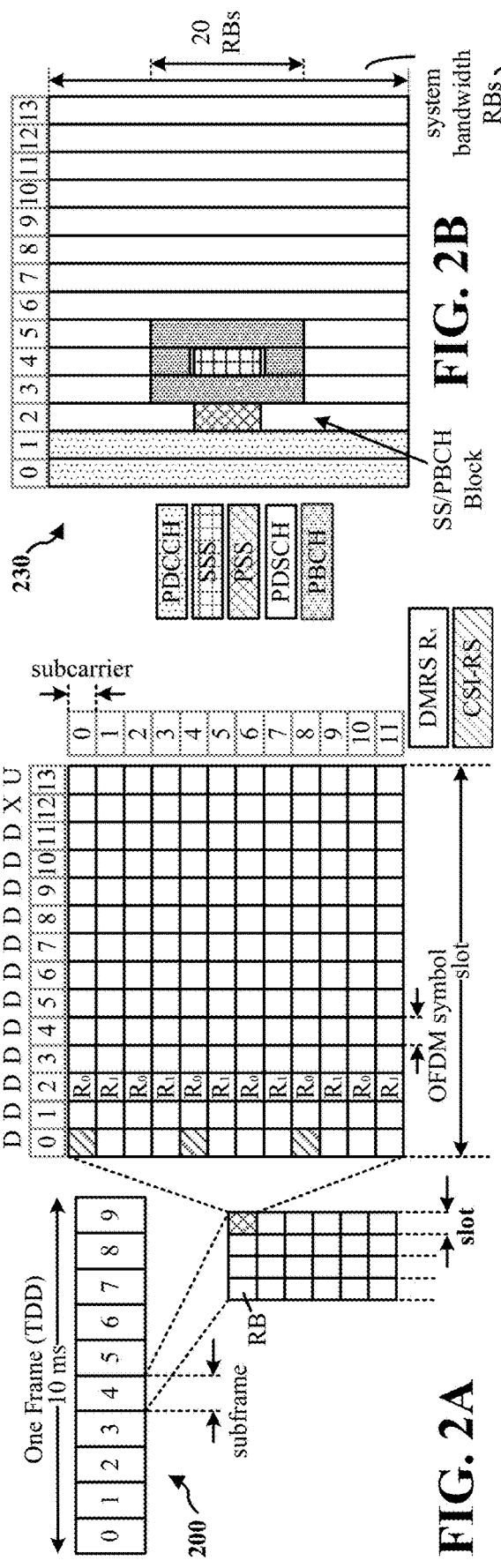
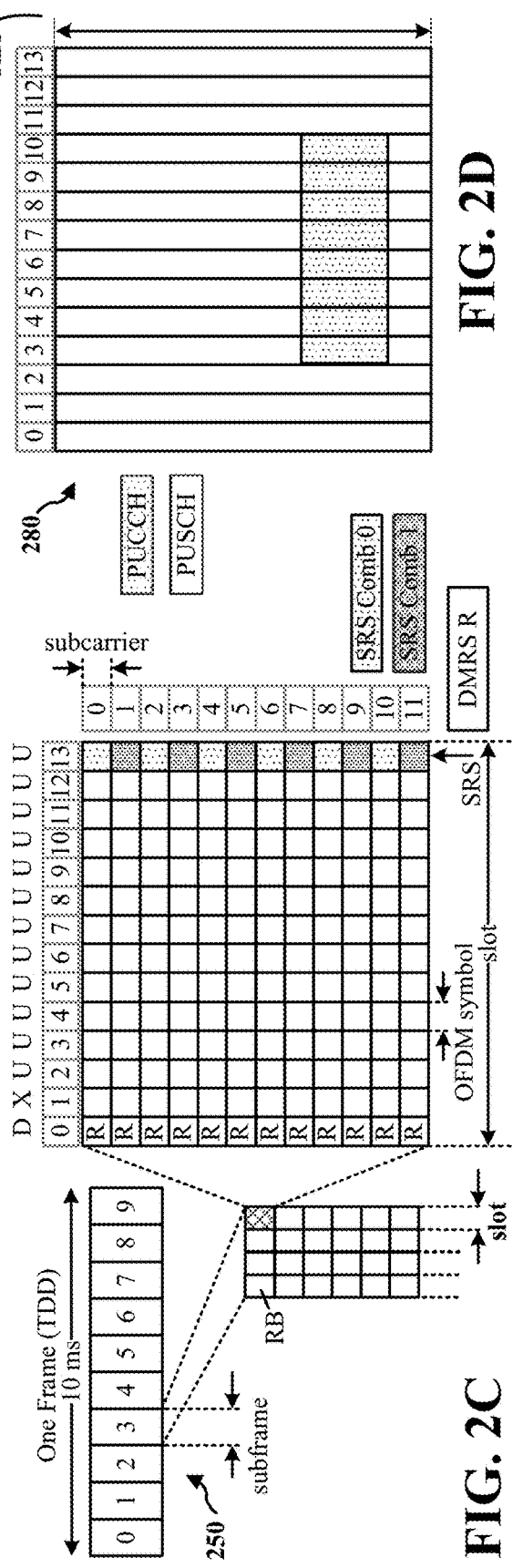
FIG. 2A
FIG. 2B
FIG. 2C
FIG. 2D

MACHINE LEARNING BASED DYNAMIC DEMODULATOR SELECTION

BACKGROUND

Technical Field

The present disclosure relates generally to wireless communication, and more particularly, implementing demodulator selection based on machine learning (ML) model coefficients trained by a base station.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method of wireless communication at a user equipment (UE) comprising transmitting a dynamic demodulator indication to a base station, and transmitting channel information to the base station. The method may further include receiving, in response to the dynamic demodulator indication, updated coefficient information based on the channel information. In addition, the method may include selecting a demodulator based on the updated coefficient information, and communicating with the base station via the demodulator in response to the selecting.

The disclosure also provides an apparatus (e.g., a UE) including a memory storing computer-executable instructions and at least one processor configured to execute the computer-executable instructions to transmit a dynamic demodulator indication to a base station, transmit channel information to the base station, receive, in response to the dynamic demodulator indication, updated coefficient information based on the channel information, select a demodulator based on the updated coefficient information, and communicate with the base station via the demodulator in response to the selecting. In addition, the disclosure also provides an apparatus including means for performing the above method, and a non-transitory computer-readable medium storing computer-executable instructions for performing the above method.

An example implementation includes a method of wireless communication at a base station comprising receiving a dynamic demodulator indication from a user equipment and receiving channel information from UE. The method may further comprise determining, based on the channel information and the dynamic demodulator indication, updated coefficient information for a machine learning model at the UE, and transmitting the updated coefficient information to the UE.

The disclosure also provides an apparatus (e.g., a base station) including a memory storing computer-executable instructions and at least one processor configured to execute the computer-executable instructions to receive a dynamic demodulator indication from a user equipment, receive channel information from UE, determine, based on the channel information and the dynamic demodulator indication, updated coefficient information for a machine learning model at the UE, and transmit the updated coefficient information to the UE. In addition, the disclosure also provides an apparatus including means for performing the above method, and a non-transitory computer-readable medium storing computer-executable instructions for performing the above method.

To the accomplishment of the foregoing and related ends, the one or more aspects include the features hereinafter fully described and particularly pointed out in the claims. The following description and the annexed drawings set forth in detail some illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first 5G/NR frame, in accordance with some aspects of the present disclosure.

FIG. 2B is a diagram illustrating an example of DL channels within a 5G/NR subframe, in accordance with some aspects of the present disclosure.

FIG. 2C is a diagram illustrating an example of a second 5G/NR frame, in accordance with some aspects of the present disclosure.

FIG. 2D is a diagram illustrating an example of UL channels within a 5G/NR subframe, in accordance with some aspects of the present disclosure.

DETAILED DESCRIPTION

Figure 1:
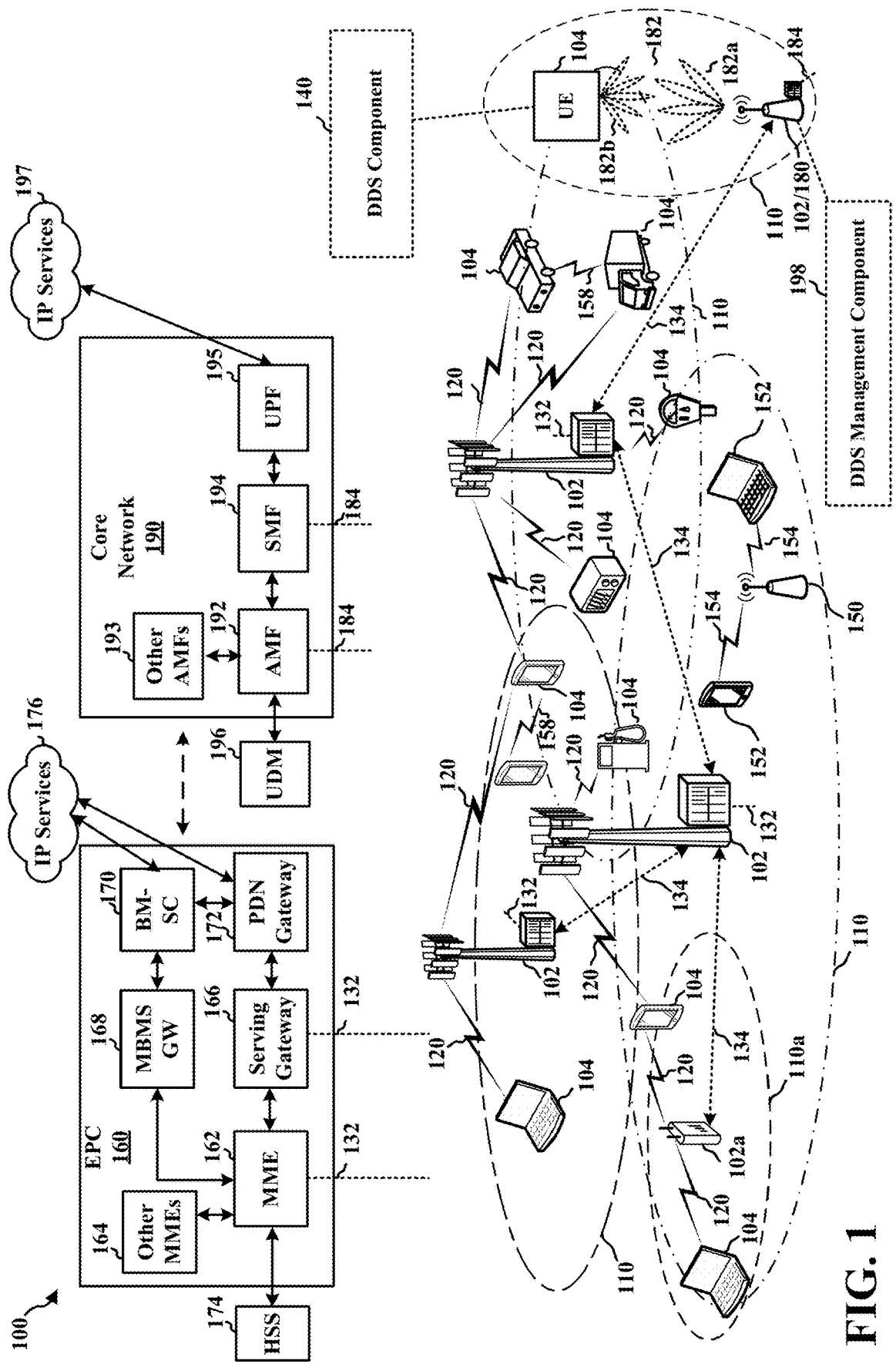
FIG. 1 is a diagram illustrating an example of a wireless communications system and an access network, in accordance with some aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to a person having ordinary skill in the art that these concepts may be practiced without these specific details. In some instances, structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Various implementations relate generally to a procedure for dynamic demodulator selection based on machine learning (ML) model coefficients trained by a base station. In some aspects, use of multiple-input and multiple-output (MIMO) antenna technology in 5G NR devices may result in inter-channel interference. As a result, many devices employ complex demodulators, e.g., a reduced maximum likelihood demodulator, to reduce inter-channel interference. However, complex demodulators are power intensive and may drain the battery life of a wireless device. As described in detail herein, a base station may periodically determine ML coefficients for a UE based on channel information related to the UE and transmit the ML coefficients to the UE to be used for dynamic demodulator selection. In response to receipt of the ML coefficients, the UE may update a local ML model to employ the ML coefficients, and dynamically select a demodulator for communications with the base station via the updated ML model. In particular, the ML model may determine whether the UE can employ a lower complexity demodulator or higher complexity demodulator based on attributes of a channel associated with the base station and the UE. Accordingly, in some aspects, a UE may be configured to reduce power consumption, while maintaining spectral efficiency by employing ML to determine the demodulator to employ for communications with a base station. Further, the UE employs ML coefficients periodically determined by a base station to avoid costly performance of ML model training.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (for example, a 5G Core (5GC)). The base stations 102 may include macrocells (high power cellular base station) or small cells (low power cellular base station). The macrocells include base stations. The small cells include femtocells, picocells, and microcells.

In an aspect, a base station 102 may include a dynamic demodulator selection (DDS) management component 198 configured to periodically determine ML coefficients for a UE 104 based on channel information and transmit the ML coefficients to the UE 104 to be used to dynamically select a demodulator of a plurality of demodulators available at the UE 104. Further, in an aspect, a UE 104 may include a DDS component 140 configured to periodically receive ML coefficients from a base station 102, update a ML model to employ the ML coefficients, and dynamically select a demodulator for communications with the base station 102 via the updated ML model.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (for example, an S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (for example, handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (for example, through the EPC 160 or core network 190) with each other over third backhaul links 134 (for example, X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102a may have a coverage area 110a that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (for example, 5, 10, 15, 20, 100, 400 MHz, among other examples) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (for example, more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102a may operate in a licensed or an unlicensed frequency spectrum. When operating in an unlicensed frequency spectrum, the small cell 102a may employ NR and use the same 5 GHz unlicensed frequency spectrum as used by the Wi-Fi AP 150. The small cell 102a, employing NR in an unlicensed frequency spectrum, may boost coverage to or increase capacity of the access network.

A base station 102, whether a small cell 102a or a large cell (for example, macro base station), may include or be referred to as an eNB, gNodeB (gNB), or another type of base station. Some base stations, such as gNB 180 may operate in one or more frequency bands within the electromagnetic spectrum. The electromagnetic spectrum is often subdivided, based on frequency/wavelength, into various classes, bands, channels, etc. In 5G NR two initial operating bands have been identified as frequency range designations FR1 (416 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to as (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range. The base station 180 and the UE 104 may each include a plurality of antennas, such as antenna elements, antenna panels, or antenna arrays to facilitate the beamforming.

The base station 180 may transmit a beamformed signal to the UE 104 in one or more transmit directions 182a. The UE 104 may receive the beamformed signal from the base station 180 in one or more receive directions 182b. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a satellite phone, a cellular phone, a smart phone, a session initiation protocol (SIP) phone, a laptop, a personal digital assistant (PDA), a satellite radio, a global positioning system, a multimedia device, a video device, a digital audio player (for example, MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (for example, parking meter, gas pump, toaster, vehicles, heart monitor, among other examples). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

FIGS. 2A-2D include example diagrams 200, 230, 250, and 280 illustrating examples structures that may be used for wireless communication by the base station 102 and the UE 104, e.g., for 5G NR communication. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description presented herein applies also to a 5G/NR frame structure that is TDD.

Other wireless communication technologies may have a different frame structure or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. For slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu *15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more CCE, each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
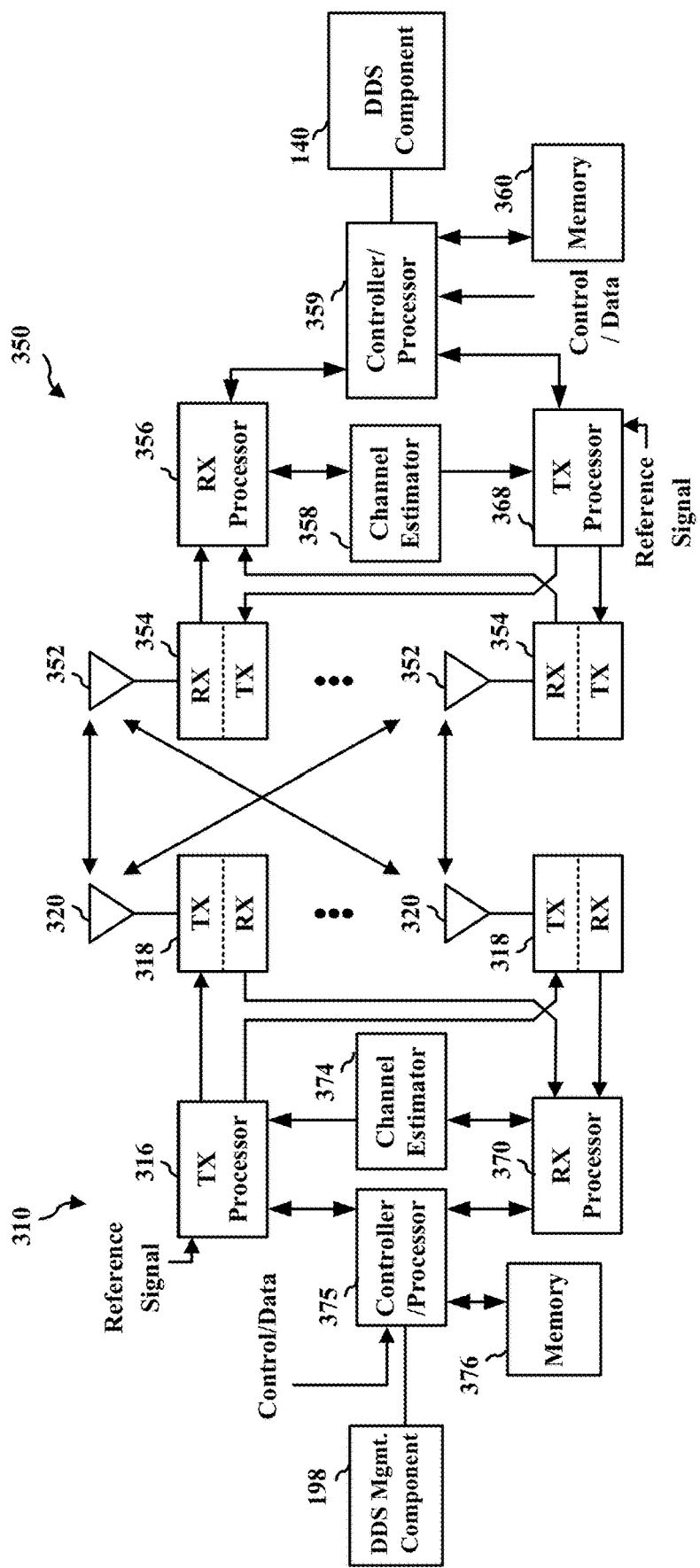
FIG. 3 is a diagram illustrating an example of a base station and a UE in an access network, in accordance with some aspects of the present disclosure.

FIG. 3 is a block diagram of a base station 102/180 in communication with a UE 104 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 102/180. These soft decisions may be based on channel estimates computed by the channel estimator 358. The soft decisions are then decoded and deinterleaved to recover the data and control signals that were originally transmitted by the base station 102/180 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 102/180, the controller/processor 359 provides RRC layer functionality associated with system information (for example, MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102/180 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 102/180 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK or NACK protocol to support HARQ operations.

In the UE 104, at least one of the TX processor 368, the RX processor 356, and the controller/processor 359 may be configured to perform aspects in connection with the DDS component 140 of FIG. 1.

In the base station 102/180, at least one of the TX processor 316, the RX processor 370, and the controller/processor 375 may be configured to perform aspects in connection with DDS management component 198 of FIG. 1.

A wireless device may include a plurality of demodulators. Furthermore, some demodulators may be better suited to provide spectral efficiency in contexts with high inter-channel interference. However, complex demodulators better suited for contexts with inter-channel interference require more battery power and may drain the battery life of a wireless device (e.g., a UE). In addition, a wireless device may not have the battery life to employ more sophisticated approaches for demodulator use. For example, a wireless device may not be able to periodically retrain a local ML model for demodulator selection. The present disclosure provides techniques for implementing demodulator selection based on ML model coefficients trained by a base station (e.g., a gNB). As described in detail above, a UE may periodically receive ML coefficients from a base station, update a ML model to employ the ML coefficients, and dynamically select a demodulator for communications with the base station via the updated ML model. As a result, the present disclosure provides power saving at the UE, without spectral efficiency loss. The UE uses a Machine Learning (ML) based algorithm for dynamic switching between demodulators. The described aspects enable the UE to switch to a less complex demodulator whenever the performance of the less complex demodulator does not degrade with respect to a more complex demodulator. In an example, the ML coefficients are dynamically updated by the base station, based on the SRS (assuming channel reciprocity) and the CSI reports of the UE. The base station can signal the updated coefficients periodically to the UE (such as in a DCI message). Accordingly, in some aspects, a UE may be configured to reduce power consumption, while maintaining spectral efficiency by employing ML to determine the demodulator to employ for communications with a base station. Further, the present shifts complex online learning to the gNB, thereby enabling UE to use the updated ML coefficients, without the need to perform complex ML operations.

In some aspects, a UE may report the capability to dynamically switch between demodulators with a PUSCH message, prior to RRC configuration. Further, UEs that have the capability to dynamically switch between demodulators can perform reporting per demodulator (e.g., a CSI report for each demodulator). In addition, a UE may further report a list of its supported demodulators, and/or the capability to use the ML coefficients provided by a gNB for updating its ML coefficients for use in demodulator selection.

Further, the gNB may receive the list of candidate demodulators from the UE and indication information identifying whether the UE supports dynamic update of its ML coefficients. In addition, a gNB may use the following information for updating ML coefficients: channel information (e.g., channel learned from SRS), SNR learned from RSSI and RSRP reports, and/or other information received by CSI and other reports. Additionally, the gNB may periodically send updated ML coefficients to the UE, e.g., the gNB may periodically send updated ML coefficients message in a DCI message. Once the updated ML coefficients are received from the gNB, the UE may updates the ML coefficients of its local ML model.

Referring to FIGS. 4-8, in one non-limiting aspect, a system 400 is configured to facilitate dynamic demodulator selection based on base station trained ML model coefficients.

Figure 4:
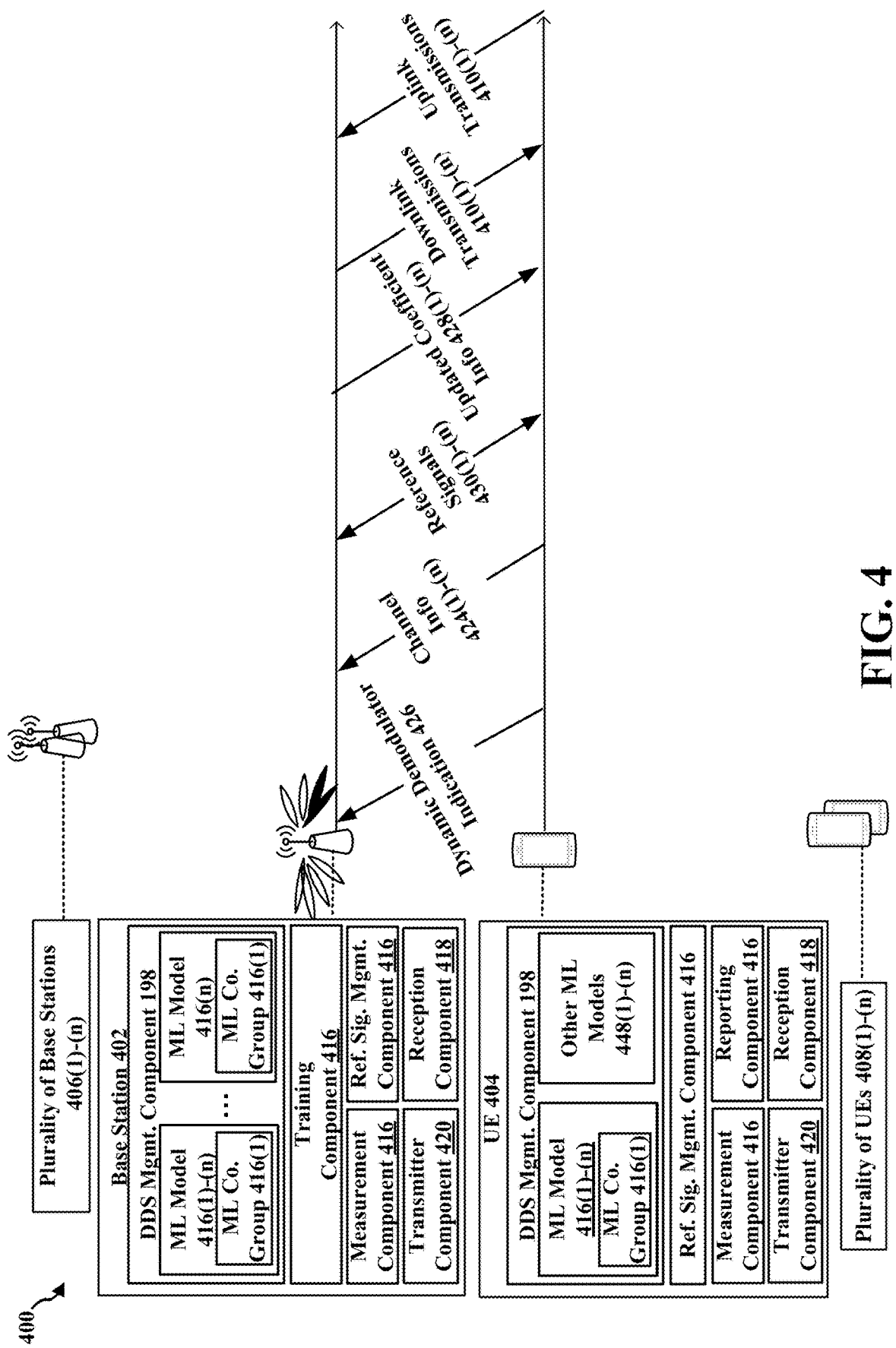
FIG. 4 is a diagram illustrating a first example of communications of a base station and a UE, in accordance with some aspects of the present disclosure.

FIG. 4 is a diagram illustrating example communications and components of base stations and UEs. As illustrated in FIG. 4, the system 400 may include a base station 402 (e.g., the base station 102/180) serving a UE 404 (e.g., the UE 104). Further, the system 400 may include one or more other base stations 406 and one or more other UEs 408 configured to perform similar operations as the base station 402 and the UE 404, respectively. Further, the base station 402 and the UE 404 may be configured for beamformed wireless communications. For example, the base station 402 may exchange downlink transmissions 410 and uplink transmissions 412 with the UE 404 using directional transmit and receive beams, where each beam has an associated beam ID, beam direction, beam symbols, etc.

As illustrated in FIG. 4, the base station 402 may include the DDS management component 198 configured to manage dynamic demodulator selection at the UE 404 and the other UEs 408. Further, the base station 402 may include a training component 414, a plurality of ML models 416(1)-(n) each associated with a ML reference signal management component coefficient group 418, a reference signal management component 420, and a measurement component 422.

In some aspects, the training component 414 may generate and update the plurality of ML models 416(1)-(n) to receive channel information 424(1)-(n) associated with a particular UE as input and determine a demodulator to be employed by the particular UE. For example, the training component 414 may be configured to generate and periodically update a first ML model 416(1) for the UE 404. Further, in some aspects, generating and updating the ML models 416(1)-(n) may include periodically determining ML coefficients for the ML coefficient groups 418 of the ML models 416(1)-(n) based on the channel information 424(1)-(n). For example, the training component 414 may be configured to periodically determine updated ML coefficients for the ML coefficient group 418(1) of the ML model 416(1) based on channel information 424(1).

In some instances, the training component 414 may configure ML model 416(1) for a UE 404 in response to receiving a dynamic demodulator indication 426 from the UE 404, periodically update the ML model 416(1), and transmit updated coefficient information 428 including the ML coefficient group 418 of the updated ML model 416 to the UE 404 in response to the channel information 424 periodically received from the UE 404. In some aspects, the base station 402 may receive the dynamic demodulator indication 426 via the PUSCH and/or transmit the updated coefficient information 428 within DCI. Further, the dynamic demodulator indication 426 may indicate that the UE 404 is capable of performing demodulation switching and updating the ML coefficient group 418(1) of the local copy of the ML model 416(1) employed for demodulation switching. Additionally, or alternatively, the dynamic demodulator indication 426 may identify two or more candidate demodulators at the UE 404. In some other aspects, the UE 404 may transmit capability information described in separate messages.

In some aspects, the base station 402 may determine the channel information 424 based on SRSs received from the UEs (e.g., the UE 404 and/or the UEs 408), signal strength information (e.g., received signal strength indicator (RSSI), reference signal received power (RSRP), etc.) received from the UEs (e.g., the UE 404 and/or the UEs 408), and/or reporting information (e.g., CSI reports) received from the UEs (e.g., the UE 404 and/or the UEs 408).

Further, the reference signal management component 420 may be configured to transmit reference signals 430(1)-(n) to the UEs (e.g., the UE 404) and receive reference signals 430(1)-(n) from the UEs (e.g., the UE 404). Some examples of the reference signals 430(1)-(n) include CSI-RS, PRS, SRS, etc. In addition, the measurement component 422 may be configured to measure the reference signals 430(1)-(n) received from the UEs and determine the channel information 424 based on the reference signals 430(1)-(n). Further, as described in detail herein, the channel information 424 may be determined from the measurements of the reference signals 430(1)-(n) received at the base station 402 and/or the measurements of the reference signals 430(1)-(n) transmitted by the base station 402 and reported by the UEs (e.g., the UE 404) to the base station 402.

In addition, the base station 402 may include a reception component 432 and a transmitter component 434. The reception component 432 may include, for example, a radio frequency (RF) receiver for receiving the signals described herein. The transmitter component 434 may include, for example, an RF transmitter for transmitting the signals described herein. In an aspect, the reception component 432 and the transmitter component 434 may be co-located in a transceiver (e.g., the transceiver 610 shown in FIG. 6).

As illustrated in FIG. 4, the UE 404 may include the DDS component 140 configured to perform dynamic demodulator switching between two or more demodulators 436(1)-(n) using updated coefficient information (e.g., updated coefficient information 428) received from a base station (e.g., the base station 402). For example, the DDS component 140 may be configured to transmit the dynamic demodulator indication 426 to the base station 402, receive updated coefficient information 428 from the base station 402, update the ML model 416(1) to utilize the updated coefficient information 428, and select a demodulator for communication with the base station 402 via the ML model 416(1). In some aspects, in response to periodically receiving the updated coefficient information 428 from the base station 402, the DDS component 140 may update the ML coefficient group 418(1) of the ML model 416(1). Further, the ML model 416 may be configured to select a demodulator, from the two or more demodulators 436(1)-(n), to use based on one or more channel attributes (e.g., SNR) and the ML coefficient group 418(1). As an example, the DDS component 140 may predict an interference value associated with a channel via the ML model 416(1), compare the predicted interference value to one or more thresholds, and select a demodulator among the candidate demodulators (i.e., the two or more demodulators 436(1)-(n)) based on the comparing. Some examples of demodulators include a MMSE demodulator, which is of low complexity, a coded soft interference cancellation MMSE (Coded SIC-MMSE), which is of medium to high complexity, and a reduced maximum likelihood (Reduced ML) demodulator, which is of high complexity.

For instance, the DDS component 140 may select the demodulator 436(1) (e.g., a less complex demodulator) based upon the predicted interference value being less than a preconfigured threshold, and the DDS component 140 may select the demodulator 436(2) (e.g., a more complex demodulator) based upon the predicted interference value being greater than the preconfigured threshold.

In addition, the UE 404 may include a reference signal management component 438, a measurement component 440, and/or a reporting component 442. In some aspects, the reference signal management component 420 may be configured to transmit the reference signals 430(1)-(n) to the base stations (e.g., the base station 402 and/or the base stations 406(1)-(n)) and receive the reference signals 430(1)-(n) from the base stations (e.g., the base station 402 and/or the base stations 406(1)-(n)). Some examples of the reference signals 430(1)-(n) include CSI-RS, PRS, SRS, etc. Further, the measurement component 422 for measuring the reference signals 430 received from the base stations (e.g., the base station 402 and the base stations 406(1)-(n) to determine the channel information 424. Further, the reporting component 442 may be configured to transmit the channel information 424 to the base stations (e.g., the base station 402 and/or the base stations 406(1)-(n)). In some aspects, the base stations may use the channel information to determine the updated coefficient information 428. Further, in some aspects, the reporting component 424 may provide individual channel information 424 for each demodulator 436, e.g., the reporting component 424 may transmit a CSI per demodulator 436.

In addition, the UE 404 may include a reception component 444 and a transmitter component 446. The transmitter component 446 may be configured to generate signals for transmission operations as described herein. The transmitter component 446 may include, for example, a RF transmitter for transmitting the signals described herein. The reception component 444 may include, for example, a RF receiver for receiving the signals described herein. In an aspect, the reception component 444 and the transmitter component 446 may be co-located in a transceiver (e.g., the transceiver 510 shown in FIG. 5). As illustrated in FIG. 4, the UE 404 may further include one or more other ML models 448 for dynamically selecting a demodulator based on updated ML coefficients for receiving communications from the other base stations 406.

Figure 5:
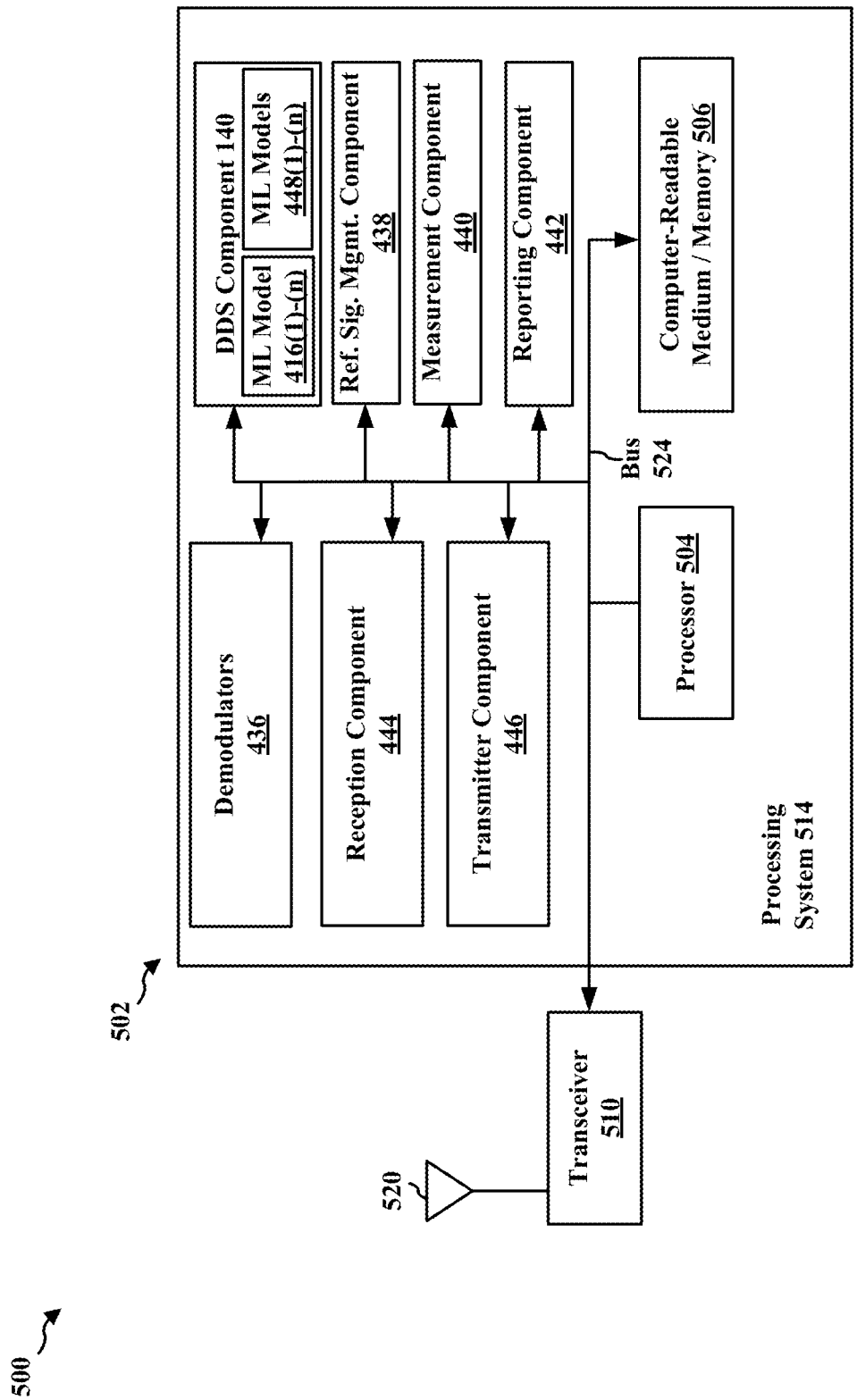
FIG. 5 is a diagram illustrating an example of a hardware implementation for a UE employing a processing system, in accordance with some aspects of the present disclosure.

FIG. 5 is a diagram 500 illustrating an example of a hardware implementation for a UE 502 (e.g., the UE 104, the UE 404, etc.) employing a processing system 514. The processing system 514 may be implemented with a bus architecture, represented generally by the bus 524. The bus 524 may include any number of interconnecting buses and/or bridges depending on the specific application of the processing system 514 and the overall design constraints. The bus 524 links together various circuits including one or more processors and/or hardware components, represented by the processor 504, the DDS component 140, the reference signal management component 438, the measurement component 440, the reporting component 442, and the computer-readable medium (e.g., non-transitory computer-readable medium)/memory 506. The bus 524 may also link various other circuits such as timing sources, peripherals, voltage regulators, and power management circuits, which are well known in the art, and therefore, will not be described any further.

The processing system 514 may be coupled with a transceiver 510. The transceiver 510 may be coupled with one or more antennas 520. The transceiver 510 provides a means for communicating with various other apparatus over a transmission medium. The transceiver 510 receives a signal from the one or more antennas, extracts information from the received signal, and provides the extracted information to the processing system 514, specifically the reception component 444. The reception component 444 may receive the downlink transmissions 410, updated coefficient information 428, and/or the reference signals 430. In addition, the transceiver 510 receives information from the processing system 514, specifically the transmitter component 446, and based on the received information, generates a signal to be applied to the one or more antennas. Further, the transmitter component 446 may transmit the uplink transmissions 412, the channel information 424, and the reference signals 430.

The processing system 514 includes a processor 504 coupled with a computer-readable medium/memory 506 (e.g., a non-transitory computer readable medium). The processor 504 is responsible for general processing, including the execution of software stored on the computer-readable medium/memory 506. The software, when executed by the processor 504, causes the processing system 514 to perform the various functions described supra for any particular apparatus. The computer-readable medium/memory 506 may also be used for storing data that is manipulated by the processor 504 when executing software. The processing system 514 further includes at least one of the DDS component 140, a reference signal management component 438, a measurement component 440, or a reporting component 442. The aforementioned components may be a software component running in the processor 504, resident/stored in the computer readable medium/memory 506, one or more hardware components coupled with the processor 504, or some combination thereof. The processing system 514 may be a component of the UE 350 and may include the memory 360 and/or at least one of the TX processor 368, the RX processor 356, and the controller/processor 359. Alternatively, the processing system 514 may be the entire UE (e.g., see 350 of FIG. 3, UE 404 of FIG. 4).

The DDS component 140 may be configured to transmit the dynamic demodulator indication 426 to the base station 402, receive updated coefficient information 428 from the base station 402, update the ML model 416(1) to utilize the updated coefficient information 428, and periodically select a demodulator for communication with the base station 402 via the ML model 416(1). Further, the reference signal management component 438 may transmit the reference signals 430 (e.g., SRSs) to the base stations (e.g., the base station 402, the base stations 406(1)-(n), the base station 602), and receive the reference signals 430 (e.g., CSI-RS) from the base stations (e.g., the base station 402, the base stations 406(1)-(n), the base station 602). The measurement component 440 may be configured to measure the reference signals 430(1)-(n). As an example, the measurement component 440 may measure characteristics (e.g., a property, attribute, or a quality) of beamformed reference signals 430(1)-(n) (e.g., CSI-RS, SSB, etc.) received from the base station 402 at the reception component 444.

The aforementioned means may be one or more of the aforementioned components of the UE 502 and/or the processing system 514 of UE 502 configured to perform the functions recited by the aforementioned means. As described supra, the processing system 514 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 6:
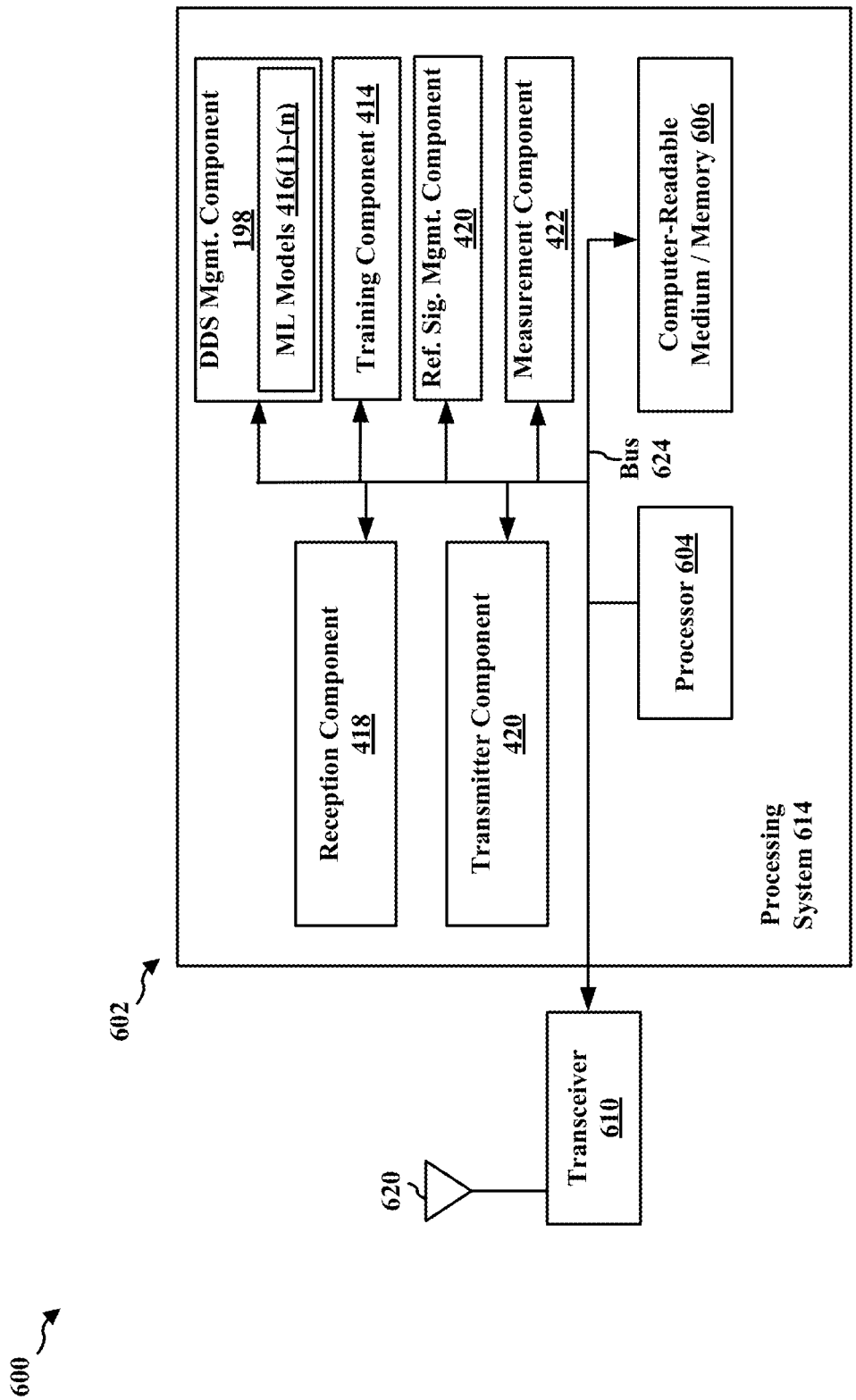
FIG. 6 is a diagram illustrating an example of a hardware implementation for a base station employing a processing system, in accordance with some aspects of the present disclosure.

FIG. 6 is a diagram 600 illustrating an example of a hardware implementation for a base station 602 employing a processing system 614. The processing system 614 may be implemented with a bus architecture, represented generally by the bus 624. The bus 624 may include any number of interconnecting buses and bridges depending on the specific application of the processing system 614 and the overall design constraints. The bus 624 links together various circuits including one or more processors and/or hardware components, represented by the processor 604, the DDS management component 198, the training component 414, the reference signal management component 420, the measurement component 422, and the computer-readable medium/memory 606. The bus 624 may also link various other circuits such as timing sources, peripherals, voltage regulators, and power management circuits, which are well known in the art, and therefore, will not be described any further.

The processing system 614 may be coupled with a transceiver 610. The transceiver 610 is coupled with one or more antennas 620. The transceiver 610 provides a means for communicating with various other apparatus over a transmission medium. The transceiver 610 receives a signal from the one or more antennas 620, extracts information from the received signal, and provides the extracted information to the processing system 614, specifically the reception component 432. The reception component 432 may receive the uplink transmissions 412, the channel information 424, and the reference signals 430. In addition, the transceiver 610 receives information from the processing system 614, specifically the transmitter component 434, and based on the received information, generates a signal to be applied to the one or more antennas 620. Further, the transmitter component 434 may send the downlink transmissions 410, the updated coefficient information 428, and the reference signals 430.

The processing system 614 includes a processor 604 coupled with a computer-readable medium/memory 606 (e.g., a non-transitory computer readable medium). The processor 604 is responsible for general processing, including the execution of software stored on the computer-readable medium/memory 606. The software, when executed by the processor 604, causes the processing system 614 to perform the various functions described supra for any particular apparatus. The computer-readable medium/memory 606 may also be used for storing data that is manipulated by the processor 604 when executing software. The processing system 614 further includes at least one of the DDS management component 198, the DDS management component 198, the training component 414, the reference signal management component 420, or the measurement component 422. The aforementioned components may be software components running in the processor 604, resident/stored in the computer readable medium/memory 606, one or more hardware components coupled with the processor 604, or some combination thereof. The processing system 614 may be a component of the base station 310 and may include the memory 376 and/or at least one of the TX processor 316, the RX processor 370, and the controller/processor 375. Alternatively, the processing system 614 may be the entire base station (e.g., see 310 of FIG. 3, base station 402 of FIG. 4).

The DDS management component 198 may be configured to receive the dynamic demodulator indication 426 from a UE, receive the channel information 424, determine updated coefficient information 428 for a ML model 316 associated with the UE, and transmit the updated coefficient information 428 to the UE. The training component 414 may be configured to generate and update the ML coefficient groups 418(1)-(n) of the ML models 416(1)-(n) corresponding to the UEs 404 and 408 (1)-(n). Further, the reference signal management component 420 may transmit the reference signals 430 (CSI-RS) to the UEs and receive the reference signals 430 (e.g., SRS) from the UEs (e.g., the UE 404, the UEs 408, and the UE 502). Further, the measurement component 422 for measuring the reference signals 430 received from the UEs (e.g., the UE 404 and/or the UEs 408) to determine the channel information 424.

The aforementioned means may be one or more of the aforementioned components of the base station 602 and/or the processing system 614 of the base station 602 configured to perform the functions recited by the aforementioned means. As described supra, the processing system 614 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 7:
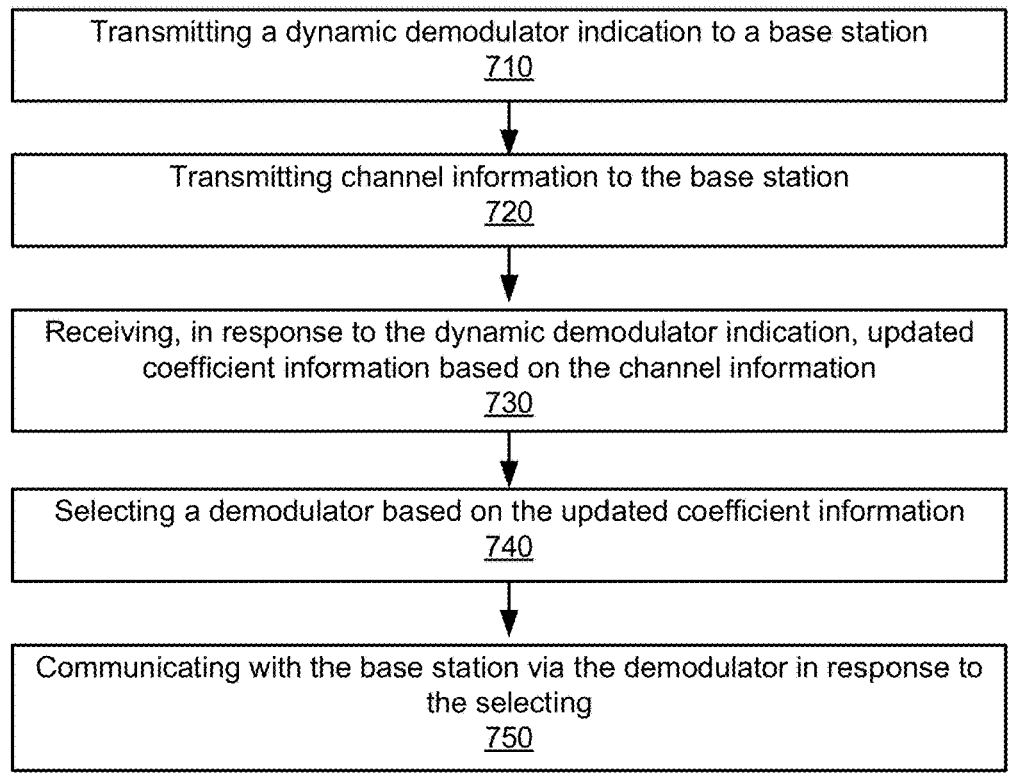
FIG. 7 is a flowchart of an example method of implementing ML based dynamic demodulator selection at a UE, in accordance with some aspects of the present disclosure.

FIG. 7 is a flowchart of a method 700 of implementing ML based dynamic demodulator selection based on base station trained ML models, in accordance with some aspects of the present disclosure. The method may be performed by a UE (e.g., the UE 104 of FIGS. 1 and 3, which may include the memory 360 and which may be the entire UE 104 or a component of the UE 104, such as the DDS component 140, the reference signal management component 438, the measurement component 440, the reporting component 442, the TX processor 368, the RX processor 356, and/or the controller/processor 359; the UE 404 of FIG. 4; and/or the UE 502 of FIG. 5).

At block 710, the method 700 may include transmitting a dynamic demodulator indication to a base station. For example, the UE 404 may transmit the dynamic demodulator indication 426 to the base station 402. The dynamic demodulator indication 426 may indicate that the UE 404 is capable of performing demodulation switching and updating the ML coefficient group 418(1) of the local copy of the ML model 416(1) employed for demodulation switching. Additionally, or alternatively, the dynamic demodulator indication 426 may identify two or more candidate demodulators at the UE 404. In some aspects, the UE 404 may transmit the dynamic demodulator indication 426 via the PUSCH. For example, the UE 404 may transmit the dynamic demodulator indication 426 via the PUSCH prior to RRC configuration.

Accordingly, the UE 104, the UE 404, UE 502, the TX processor 368, the RX processor 356, and/or the controller/processor 359, executing the DDS component 140 may provide means for transmitting a dynamic demodulator indication to a base station.

At block 720, the method 700 may include transmitting channel information to the base station. For example, the UE 404 may transmit the channel information 424 to the base station 402. In some aspects, the channel information 424 may be a reference signal 430 (e.g., SRS), signal strength information, and/or reporting information.

Accordingly, the UE 104, the UE 404, UE 502, the TX processor 368, the RX processor 356, and/or the controller/processor 359 executing the DDS component 140 may provide means for transmitting channel information to the base station.

At block 730, the method 700 may include receiving, in response to the dynamic demodulator indication, updated coefficient information based on the channel information. For example, the UE 404 may receive the updated coefficient information 428 from the base station 402. In some aspects, the updated coefficient information 428 may include an updated ML coefficient group 418(1) for the ML model 416(1) of the UE 404. Further, in some aspects, the UE 404 may receive the updated coefficient information 428 via a DCI message.

Accordingly, the UE 104, the UE 404, UE 502, the TX processor 368, the RX processor 356, and/or the controller/processor 359, executing the DDS component 140 may provide means for receiving, in response to the dynamic demodulator indication, updated coefficient information based on the channel information.

At block 740, the method 700 may include selecting a demodulator based on the updated coefficient information. For example, the UE 404 may employ the ML model 416(1) to select a demodulator from among a plurality of candidate demodulators (i.e., the two or more demodulators 436(1)-(n)). As described in detail herein, the ML model 416(1) selects the demodulator based upon a prediction of performance in view of the updated coefficient information.

Accordingly, the UE 104, the UE 404, UE 502, the TX processor 368, the RX processor 356, and/or the controller/processor 359 executing the DDS component 140 may provide means for selecting a demodulator based on the updated coefficient information.

At block 750, the method 700 may include communicating with the base station via the demodulator in response to the selecting. For example, the UE 404 may receive the downlink transmissions 410 from the base station 402 via the selected demodulator.

Accordingly, the UE 104, the UE 404, UE 502, the TX processor 368, the RX processor 356, and/or the controller/processor 359 executing the DDS component 140 may provide means for communicating with the base station via the demodulator in response to the selecting.

Additionally, or alternatively, in order to select, the demodulator based on the updated coefficient information, the method 700 may include configuring a machine learning model to use the updated coefficient information, predicting an interference value via the machine learning model, and selecting the demodulator based upon comparing the interference value to a preconfigured threshold. For example, the ML model 416 may be configured to employ the updated coefficient information 428. Additionally, the ML model 416(1) may predict an interference value of a channel (e.g., the PDSCH) with the base station 402. In addition, in some aspects, the DDS component 140 may select a demodulator from the two or more demodulators 436(1)-(n) based on the comparing the interference value to an interference threshold identifying whether a less complex and less power-intensive demodulator may be used by the UE 404. Accordingly, the UE 104, the UE 404, UE 502, the TX processor 368, the RX processor 356, and/or the controller/processor 359 executing the DDS component 140 and/or the ML model 416(1) may provide means for configuring a machine learning model to use the updated coefficient information, predicting an interference value via the machine learning model, and selecting the demodulator based upon comparing the interference value to a preconfigured threshold.

Figure 8:
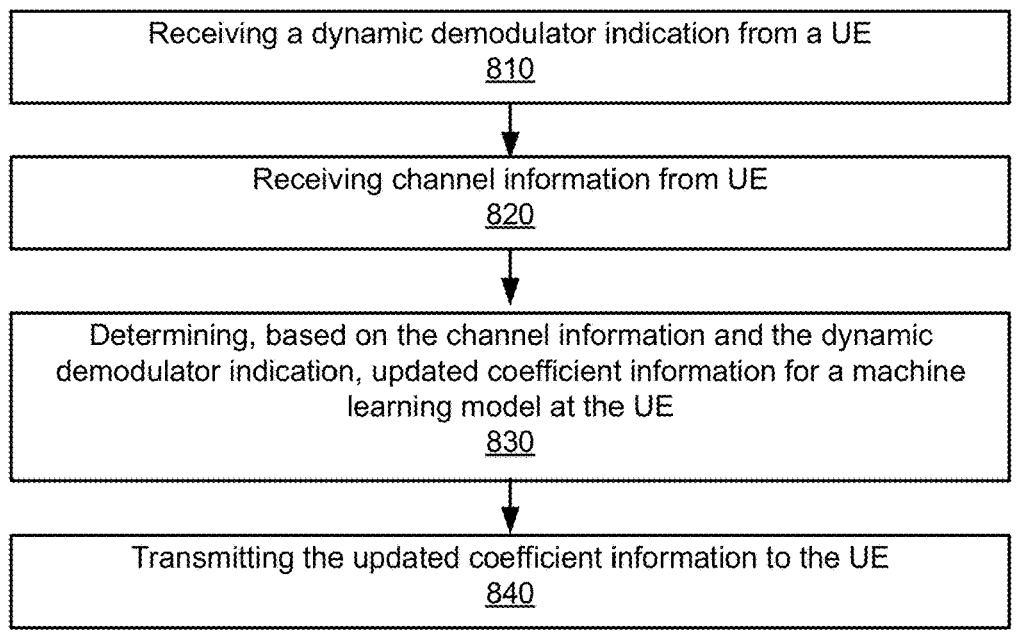
FIG. 8 is a flowchart of an example method of implementing ML based dynamic demodulator selection at a base station, in accordance with some aspects of the present disclosure.

FIG. 8 is a flowchart of a method 800 of implementing ML based dynamic demodulator selection based on base station trained ML models, in accordance with some aspects of the present disclosure. The method may be performed by a base station (e.g., the base station 102, which may include the memory 376 and which may be the entire base station or a component of the base station, such as DDS management component 198, the reference signal management component 417, the TX processor 316, the RX processor 370, and/or the controller/processor 375; the base station 402, the base station 602).

At block 810, the method 800 may include receiving a dynamic demodulator indication from a UE. For example, the base station 402 may receive the channel information 424 from the UE 404. In some aspects, the channel information 424 may be a reference signal 430 (e.g., SRS), signal strength information and/or reporting information. In some aspects, the base station 402 may receive the dynamic demodulator indication 426 via the PUSCH.

Accordingly, the base station 102, the TX processor 316, the RX processor 370, and/or the controller/processor 375 executing the DDS management component 198 may provide means for receiving a dynamic demodulator indication from a UE.

At block 820, the method 800 may include receiving channel information from UE. For example, the base station 402 may receive the channel information 424 from the UE 404. In some aspects, the channel information 424 may be a reference signal 430 (e.g., SRS), signal strength information, and/or reporting information.

Accordingly, the base station 102, the RX processor 370, and/or the controller/processor 375 executing the DDS management component 198 may provide means for receiving channel information from UE.

At block 830, the method 800 may include determining, based on the channel information and the dynamic demodulator indication, updated coefficient information for a machine learning model at the UE. For example, the training component 414 may update the ML coefficient group 418 of the ML model 416(1) associated with the UE 404 based on the channel information 424.

Accordingly, the base station 102, the RX processor 370, and/or the controller/processor 375 executing the DDS management component 198 may provide means for determining, based on the channel information and the dynamic demodulator indication, updated coefficient information for a machine learning model at the UE.

At block 840, the method 800 may include transmitting the updated coefficient information to the UE. For example, the base station 402 may transmit the updated coefficient information 428 to the UE 404. Further, the updated coefficient information 428 may include the updated ML coefficient group 418(1) for the ML model 416(1) of the UE 404. Further, in some aspects, the base station 402 may transmit the updated coefficient information 428 via a DCI message.

Accordingly, the base station 102, the RX processor 370, and/or the controller/processor 375 executing the DDS management component 198 may provide means for transmitting the updated coefficient information to the UE.

Additionally, in some aspects, the method 800 may further include transmitting communications to the UE, the UE configured to receive the communications via a demodulator selected using the updated coefficient information. For example, the base station 402 may transmit the downlink transmissions 410 to UE 404 to be received via use of the demodulator selected based on the updated coefficient information 428. Accordingly, the base station 102, the RX processor 370, and/or the controller/processor 375 executing the DDS management component 198 may provide means for transmitting communications to the UE, the UE configured to receive the communications via a demodulator selected using the updated coefficient information.

The specific order or hierarchy of blocks in the processes/flowcharts disclosed is an illustration of example approaches. Based upon design preferences, the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person having ordinary skill in the art to practice the various aspects described herein. Various modifications to these aspects will be readily apparent to a person having ordinary skill in the art, and the generic principles defined herein may be applied to other aspects. The claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to a person having ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following provides an overview of aspects of the present disclosure:

Aspect 1: A method of wireless communication at a UE, the method comprising: transmitting a dynamic demodulator indication to a base station, transmitting channel information to the base station, receiving, in response to the dynamic demodulator indication, updated coefficient information based on the channel information, selecting a demodulator based on the updated coefficient information, and communicating with the base station via the demodulator in response to the selecting.

Aspect 2: The method of aspect 1, wherein transmitting the dynamic demodulator indication to the base station comprises transmitting a plurality of demodulator identifiers, wherein each demodulator identifier identifies a candidate demodulator available at the UE.

Aspect 3: The method of any of aspects 1 or 2, wherein the dynamic demodulator indication indicates that the UE is configured to update a machine learning model using the updated coefficient information.

Aspect 4: The method of any of aspects 1-3, wherein transmitting the dynamic demodulator indication to the base station comprises transmitting the dynamic demodulator indication via a physical uplink shared channel.

Aspect 5: The method of any of aspects 1-4, wherein transmitting the channel information to the base station comprises transmitting a sounding reference signal to the base station.

Aspect 6: The method of any of aspects 1-4, wherein transmitting the channel information to the base station comprises transmitting signal strength information to the base station.

Aspect 7: The method of any of aspects 1-6, wherein receiving the updated coefficient information comprises receiving the updated coefficient information within downlink control information (DCI).

Aspect 8: The method of any of aspects 1-7, wherein selecting the demodulator based on the updated coefficient information comprises: configuring a machine learning model to use the updated coefficient information, predicting an interference value via the machine learning model, and selecting the demodulator based upon comparing the interference value to a preconfigured threshold.

Aspect 9: A UE for wireless communication, comprising a memory storing computer-executable instructions; and at least one processor coupled with the memory and configured to execute the computer-executable instructions to perform the method of any of aspects 1-8.

Aspect 10: A UE for wireless communication, comprising means for performing the method of any of aspects 1-8.

Aspect 11: A non-transitory computer-readable medium storing computer executable code, the code when executed by a processor causes the processor to perform the method of any of aspects 1-8.

Aspect 12: A method of wireless communication at a base station, the method comprising: receiving a dynamic demodulator indication from a user equipment (UE), receiving channel information from the UE, determining, based on the channel information and the dynamic demodulator indication, updated coefficient information for a machine learning model at the UE, and transmitting the updated coefficient information to the UE.

Aspect 13: The method of aspect 12, wherein receiving the dynamic demodulator indication comprises receiving a plurality of demodulator identifiers, wherein each demodulator identifier identifies a candidate demodulator available at the UE.

Aspect 14: The method aspect 12 or 13, wherein the dynamic demodulator indication indicates that the UE is configured to update the machine learning model using the updated coefficient information.

Aspect 15: The method of any of aspects 12-14, wherein receiving the dynamic demodulator indication comprises receiving the dynamic demodulator indication via a physical uplink shared channel.

Aspect 16: The method of any of aspects 12-15, wherein receiving the channel information comprises receiving a sounding reference signal (SRS) from the UE, and determining the channel information based on the SRS.

Aspect 17: The method of any of aspects 12-16, wherein receiving the channel information comprises receiving signal strength information from the UE, and determining the channel information based on the signal strength information.

Aspect 18: The method of any of aspects 12-17, wherein transmitting the updated coefficient information to the UE comprises transmitting the updated coefficient information within downlink control information (DCI).

Aspect 19: The method of any of aspects 12-18, further comprising transmitting communications to the UE, the UE configured to receive the communications via a demodulator selected using the updated coefficient information.

Aspect 20: A base station for wireless communication, comprising a memory storing computer-executable instructions; and at least one processor coupled with the memory and configured to execute the computer-executable instructions to perform the method of any of aspects 12-19.

Aspect 21: A base station for wireless communication, comprising means for performing the method of any of aspects 12-19.

Aspect 22: A non-transitory computer-readable medium storing computer executable code, the code when executed by a processor causes the processor to perform the method of any of aspects 12-19.

What is claimed is:

1. A user equipment (UE) for wireless communication, comprising:
    a memory storing computer-executable instructions; and
    at least one processor coupled with the memory and configured to execute the computer-executable instructions to:
        transmit a dynamic demodulator indication to a base station, wherein the dynamic demodulator indication indicates that the UE is capable of performing demodulation switching between a plurality of candidate demodulators available at the UE;
        transmit channel information to the base station;
        receive, in response to the dynamic demodulator indication, updated coefficient information based on the channel information;
        select, from the plurality of candidate demodulators available at the UE, a demodulator based on the updated coefficient information; and
        communicate with the base station via the demodulator in response to the selecting.

2. The UE of claim 1, wherein to transmit the dynamic demodulator indication to the base station, the at least one processor is configured to transmit a plurality of demodulator identifiers, wherein each demodulator identifier identifies a candidate demodulator available at the UE of the plurality of candidate demodulators available at the UE.

3. The UE of claim 1, wherein the dynamic demodulator indication indicates that the UE is configured to update a machine learning model, employed by the UE to switch between the plurality of candidate demodulators, using the updated coefficient information.

4. The UE of claim 1, wherein to transmit the dynamic demodulator indication to the base station, the at least one processor is configured to transmit the dynamic demodulator indication via a physical uplink shared channel.

5. The UE of claim 1, wherein to transmit the channel information to the base station, the at least one processor is configured to transmit a sounding reference signal to the base station.

6. The UE of claim 1, wherein to transmit the channel information to the base station, the at least one processor is configured to transmit signal strength information to the base station.

7. The UE of claim 1, wherein to receive the updated coefficient information, the at least one processor is configured to receive the updated coefficient information within downlink control information (DCI).

8. The UE of claim 1, wherein to select the demodulator based on the updated coefficient information comprises, the at least one processor is configured to:
    configure a machine learning model to use the updated coefficient information;
    predict an interference value via the machine learning model; and
    select the demodulator based upon comparing the interference value to a preconfigured threshold.

9. A method of wireless communication at a UE, comprising:
    transmitting a dynamic demodulator indication to a base station, wherein the dynamic demodulator indication indicates that the UE is capable of performing demodulation switching between a plurality of candidate demodulators available at the UE;
    transmitting channel information to the base station;
    receiving, in response to the dynamic demodulator indication, updated coefficient information based on the channel information;
    selecting, from the plurality of candidate demodulators available at the UE, a demodulator based on the updated coefficient information; and
    communicating with the base station via the demodulator in response to the selecting.

10. The method of claim 9, wherein transmitting the dynamic demodulator indication to the base station comprises transmitting a plurality of demodulator identifiers, wherein each demodulator identifier identifies a candidate demodulator available at the UE of the plurality of candidate demodulators available at the UE.

11. The method of claim 9, wherein the dynamic demodulator indication indicates that the UE is configured to update a machine learning model, employed by the UE to switch between the plurality of candidate demodulators, using the updated coefficient information.

12. The method of claim 9, wherein transmitting the dynamic demodulator indication to the base station comprises transmitting the dynamic demodulator indication via a physical uplink shared channel.

13. The method of claim 9, wherein transmitting the channel information to the base station comprises transmitting a sounding reference signal to the base station.

14. The method of claim 9, wherein transmitting the channel information to the base station comprises transmitting signal strength information to the base station.

15. The method of claim 9, wherein receiving the updated coefficient information comprises receiving the updated coefficient information within downlink control information (DCI).

16. The method of claim 9, wherein selecting the demodulator based on the updated coefficient information comprises:
    configuring a machine learning model to use the updated coefficient information;
    predicting an interference value via the machine learning model; and
    selecting the demodulator based upon comparing the interference value to a preconfigured threshold.

17. A base station for wireless communication, comprising:
    a memory storing computer-executable instructions; and at least one processor coupled with the memory and configured to execute the computer-executable instructions to:
- receive a dynamic demodulator indication from a user equipment (UE), wherein the dynamic demodulator indication indicates that the UE is capable of performing demodulation switching between a plurality of candidate demodulators available at the UE;
- receive channel information from the UE;
- determine, based on the channel information and the dynamic demodulator indication, updated coefficient information for a machine learning model at the UE; and
- transmit the updated coefficient information to the UE.

18. The base station of claim 17, wherein to receive the dynamic demodulator indication, the at least one processor is configured to receive a plurality of demodulator identifiers, wherein each demodulator identifier identifies a candidate demodulator available at the UE of the plurality of candidate demodulators available at the UE.

19. The base station of claim 17, wherein the dynamic demodulator indication indicates that the UE is configured to update the machine learning model, employed by the UE to switch between the plurality of candidate demodulators, using the updated coefficient information.

20. The base station of claim 17, wherein to receive the dynamic demodulator indication, the at least one processor is configured to the dynamic demodulator indication via a physical uplink shared channel.

21. The base station of claim 17, wherein to receive the channel information, the at least one processor is configured to receive a sounding reference signal (SRS) from the UE, and determine the channel information based on the SRS.

22. The base station of claim 17, wherein to receive the channel information, the at least one processor is configured to receive signal strength information from the UE, and determine the channel information based on the signal strength information.

23. The base station of claim 17, wherein to transmit the updated coefficient information to the UE, the at least one processor is configured to transmit the updated coefficient information within downlink control information (DCI).

24. The base station of claim 17, wherein the at least one processor is further configured to transmit communications to the UE, the UE configured to receive the communications via a demodulator selected using the updated coefficient information.

25. A method of wireless communication at a base station, comprising:
- receiving a dynamic demodulator indication from a user equipment (UE), wherein the dynamic demodulator indication indicates that the UE is capable of performing demodulation switching between a plurality of candidate demodulators available at the UE;
- receiving channel information from the UE;
- determining, based on the channel information and the dynamic demodulator indication, updated coefficient information for a machine learning model at the UE; and
- transmitting the updated coefficient information to the UE.

26. The method of claim 25, wherein receiving the dynamic demodulator indication comprises receiving a plurality of demodulator identifiers, wherein each demodulator identifier identifies a candidate demodulator available at the UE of the plurality of candidate demodulators available at the UE.

27. The method of claim 25, wherein receiving the channel information comprises receiving signal strength information from the UE, and determining the channel information based on the signal strength information.

28. The method of claim 25, wherein transmitting the updated coefficient information to the UE comprises transmitting the updated coefficient information within downlink control information (DCI).

29. The method of claim 25, further comprising transmitting communications to the UE, the UE configured to receive the communications via a demodulator selected using the updated coefficient information.

30. The method of claim 25, wherein the dynamic demodulator indication indicates that the UE is configured to update the machine learning model, employed by the UE to switch between the plurality of candidate demodulators, using the updated coefficient information.

* * * * *